United States Patent
Fahrbach

(10) Patent No.: US 11,906,721 B2
(45) Date of Patent: *Feb. 20, 2024

(54) METHOD AND DEVICE FOR MANIPULATING A BEAM PATH IN A MICROSCOPE, METHOD FOR RECORDING IMAGE STACKS IN A MICROSCOPE

(71) Applicant: LEICA MICROSYSTEMS CMS GMBH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 616 days.

This patent is subject to a terminal disclaimer.

(21) Appl. No.: 16/979,894

(22) PCT Filed: Mar. 18, 2019

(86) PCT No.: PCT/EP2019/056731
§ 371 (c)(1),
(2) Date: Sep. 11, 2020

(87) PCT Pub. No.: WO2019/175441
PCT Pub. Date: Sep. 19, 2019

(65) Prior Publication Data
US 2020/0409128 A1    Dec. 31, 2020

(30) Foreign Application Priority Data

Mar. 16, 2018 (DE) .................. 10 2018 204 097.4
Apr. 26, 2018 (DE) .................. 10 2018 206 486.5

(51) Int. Cl.
*G02B 21/00* (2006.01)
*G02B 3/14* (2006.01)
*G02B 21/36* (2006.01)

(52) U.S. Cl.
CPC ............. *G02B 21/006* (2013.01); *G02B 3/14* (2013.01); *G02B 21/365* (2013.01)

(58) Field of Classification Search
CPC ...... G02B 21/006; G02B 3/14; G02B 21/365; G02B 26/0825; G02B 21/242; G02B 7/38;

(Continued)

(56) References Cited

U.S. PATENT DOCUMENTS

| 5,017,008 A | 5/1991 | Akiyama |
|---|---|---|
| 2003/0067861 A1 | 4/2003 | Kimura |

(Continued)

FOREIGN PATENT DOCUMENTS

| CN | 1459785 A | 12/2003 |
|---|---|---|
| DE | 102014101762 A1 | 8/2015 |

(Continued)

OTHER PUBLICATIONS

Ryan, Duncan P. et al. "Automatic and adaptive heterogeneous refractive index compensation for light-sheet microscopy," in: Nat Commun. 8, 612, Sep. 20, 2017.

*Primary Examiner* — Mustak Choudhury
(74) *Attorney, Agent, or Firm* — Leydig, Voit & Mayer, Ltd.

(57) ABSTRACT

A method for manipulating at least one beam path in a microscope includes ascertaining a refractive index of a sample arranged in a sample volume and/or of an optical medium arranged in the sample volume. At least one microscope parameter is set in dependence on the ascertained refractive index for manipulating the beam path.

24 Claims, 7 Drawing Sheets

(58) Field of Classification Search
CPC .. G02B 27/0068; G02B 21/025; G02B 21/16; G02B 21/18; G02B 21/367; G01N 21/41
See application file for complete search history.

(56) References Cited

U.S. PATENT DOCUMENTS

| | | |
|---|---|---|
| 2003/0202451 A1 | 10/2003 | Kimura et al. |
| 2004/0047040 A1 | 3/2004 | Ota et al. |
| 2014/0267597 A1* | 9/2014 | Yu ..................... G03H 1/0443 348/40 |
| 2015/0015871 A1 | 1/2015 | Tamano |
| 2016/0320301 A1* | 11/2016 | Knebel ............... G02B 21/088 |
| 2016/0363752 A1 | 12/2016 | Mizunaka et al. |
| 2017/0017071 A1 | 1/2017 | Ue et al. |
| 2017/0089837 A1* | 3/2017 | Matsumoto ............ G01B 9/021 |
| 2017/0168280 A1 | 6/2017 | Schumann |
| 2017/0219809 A1* | 8/2017 | Wald ................... G02B 21/002 |
| 2018/0306714 A1* | 10/2018 | Bergter ............... G02B 21/244 |

FOREIGN PATENT DOCUMENTS

| | | |
|---|---|---|
| DE | 112015002339 T5 | 2/2017 |
| DE | 102015119258 A1 | 5/2017 |
| JP | H01242939 A | 9/1989 |
| JP | 2007-199511 A | 8/2007 |
| JP | 2016540989 A | 12/2016 |
| JP | 2017003748 A | 1/2017 |

\* cited by examiner

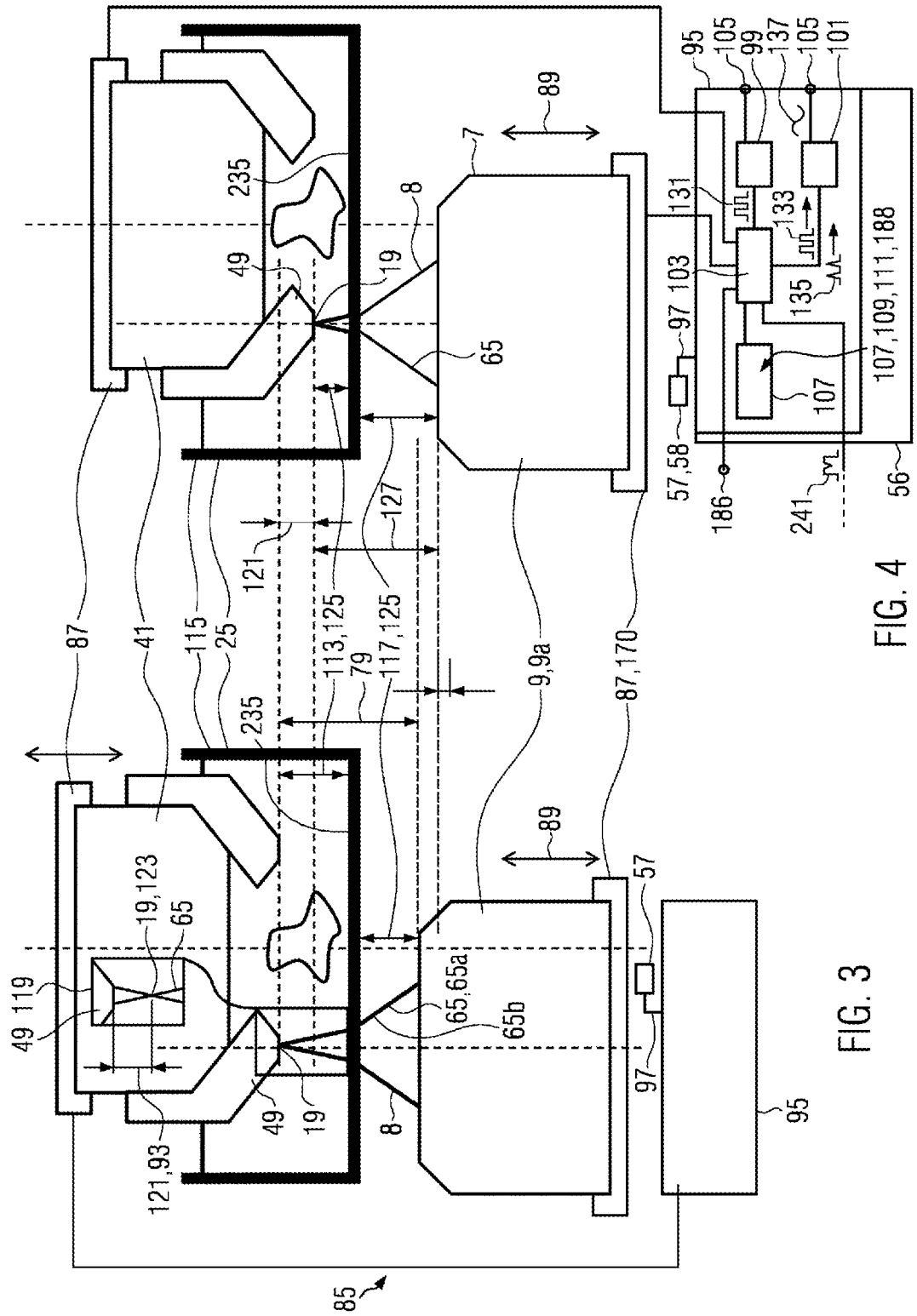

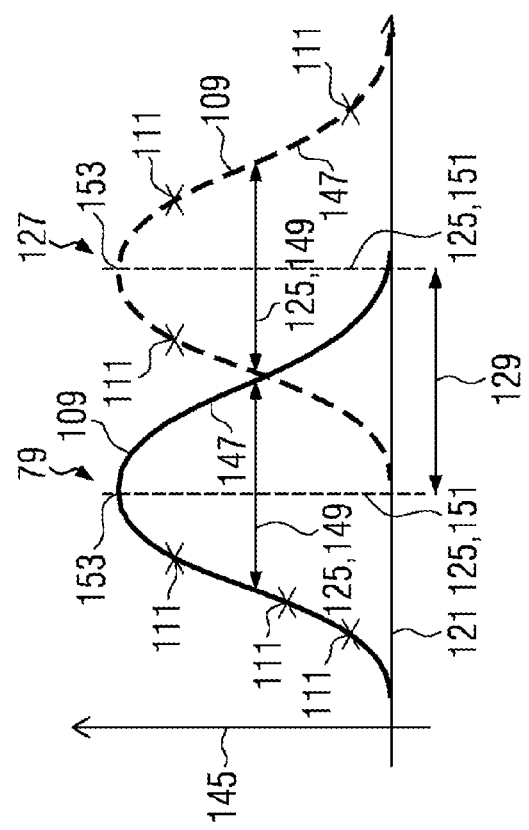

METHOD AND DEVICE FOR MANIPULATING A BEAM PATH IN A MICROSCOPE, METHOD FOR RECORDING IMAGE STACKS IN A MICROSCOPE

CROSS-REFERENCE TO PRIOR APPLICATIONS

This application is a U.S. National Phase application under 35 U.S.C. § 371 of International Application No. PCT/EP2019/056731, filed on Mar. 18, 2019, and claims benefit to German Patent Application Nos. DE 10 2018 204 097.4, filed on Mar. 16, 2018, and DE 10 2018 206 486.5, filed on Apr. 26, 2018. The International Application was published in German on Sep. 19, 2019 as WO 2019/175441 A1 under PCT Article 21(2).

FIELD

The invention relates to a method for manipulating at least one beam path in a microscope, in particular in a light-sheet microscope, to a method for recording image stacks in a microscope, in particular in a light-sheet microscope, to an apparatus for the refractive-index-dependent manipulation of at least one beam path in a microscope, in particular in a light-sheet microscope, and to a non-volatile, computer-readable storage medium.

BACKGROUND

Methods that are referred to as clearing methods and permit the recording of samples in an immersion medium, wherein the immersion medium can be adapted in respect of its refractive index to the sample to be examined or the refractive index of the sample can be homogenized, are currently known in the prior art. The latter method does not result in the refractive index of the sample also being adapted to that of the medium. A multiplicity (more than 20) of such immersion media, which can be alcohol-based or sugar-based, are known. The examination of living samples is not possible with this method because the samples have been massively chemically changed, for example by removing fats.

On the other hand, there also exists the desire to embed living cells and organisms into a medium having a refractive index that corresponds to that of the object that is to be examined. Immersion media can be used in addition to their different refractive indexes in different mixing ratios with a corresponding solvent. This results in a large variation and in particular uncertainty relating to the refractive index of the immersion medium that is currently being used.

The refractive index of the immersion medium, however, is greatly responsible for the occurrence of aberrations, in particular defocus and spherical aberrations. These effects that are dependent on the refractive index can deteriorate a microscopic recording.

If what is known as a light-sheet microscope is used for examining a sample in an immersion medium, a refractive index that is not taken into account can result in a focal plane of a detection optical unit being shifted owing to different refraction caused by the refractive index of the immersion medium and/or of the sample, until said sample no longer coincides with the light sheet generated by the illumination objective (i.e. a two-dimensional illuminated plane). In other words, a defocus in a light-sheet microscope can bring about grave quality losses for the recorded images.

For this reason, iterative and image-based algorithms and methods based thereon, which make changes to at least one microscope parameter based on the image quality and can thus compensate possibly occurring aberrations in an approximation method are known in the prior art.

SUMMARY

In an embodiment, the present invention provides a method for manipulating at least one beam path in a microscope. The method includes ascertaining a refractive index of a sample arranged in a sample volume and/or of an optical medium arranged in the sample volume. At least one microscope parameter is set in dependence on the ascertained refractive index for manipulating the beam path.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIGS. 3 and 4 show an apparatus according to an embodiment of the invention, in particular a first measurement method for determining the refractive index;

FIG. 5 shows the method step for determining the refractive index according to the first measurement method;

DETAILED DESCRIPTION

Figure 1:
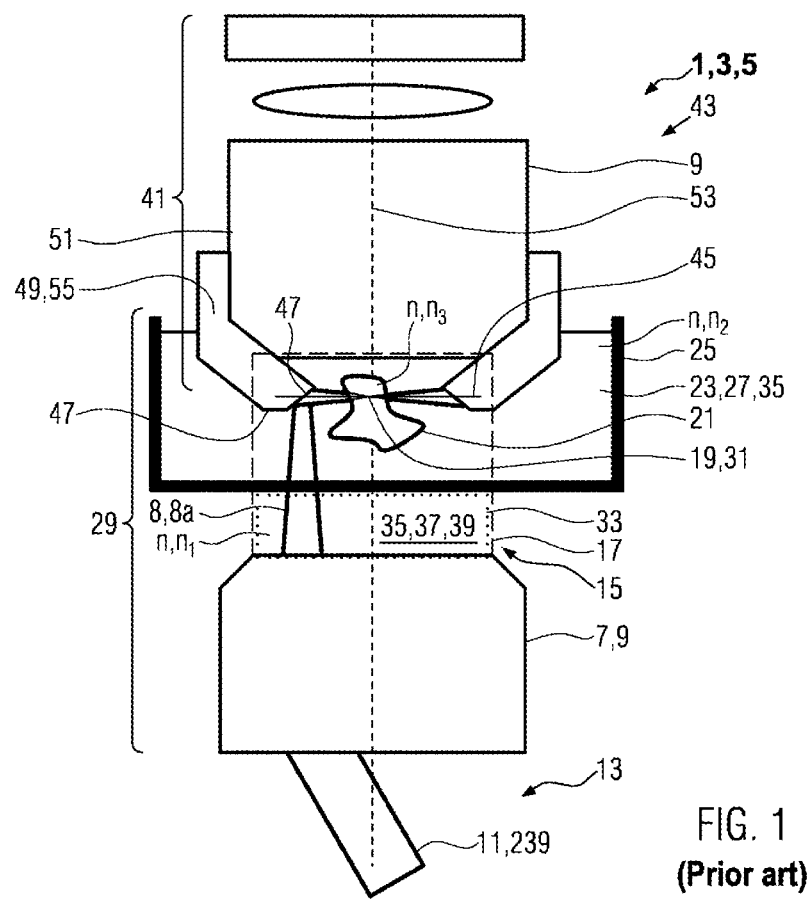
FIG. 1 shows a light-sheet microscope from the prior art.

In the clearing method from the prior art, objectives having a low numerical aperture (NA) are preferably used preventatively because the abovementioned aberrations are negligible in said objectives having a low NA. In confocal microscopy methods that use for example a single objective so that both an illumination beam path and a detection beam path are subject to aberrations in the same "direction," that is to say having the same sign, the stated aberrations can also be negligible. However, it is desirable to be able to also use objectives having a high NA so as to achieve a greater resolution and to more efficiently detect the light coming from the sample.

Embodiments of the present invention provide to view samples in any desired immersion media and to be able to use objectives with a high NA for the viewing.

This is achieved by a method according to an embodiment of the invention for manipulating at least one beam path by way of the following method steps:

ascertaining the refractive index of a sample arranged in a sample volume and/or of an optical medium arranged in a sample volume; and setting at least one microscope parameter in dependence on the ascertained refractive index for manipulating the beam path.

The above-mentioned features can also be obtained by a method according to an embodiment of the invention for recording image stacks in a microscope comprising the following method steps: ascertaining the refractive index of a sample arranged in the sample volume and/or of an optical medium arranged in a sample volume; capturing a change in the position of the sample with respect to the optical arrangement and/or capturing the changes in an excitation wavelength before at least one microscope parameter has been set; and setting at least one microscope parameter in dependence on the ascertained refractive index for manipulating the beam path.

The above-mentioned features can also be obtained by an apparatus according to an embodiment of the invention comprising: a refractive-index ascertainment module for ascertaining the refractive index of a sample and/or the refractive index of an optical medium arranged in a sample volume; and at least one beam path manipulator for setting at least one microscope parameter based on the ascertained refractive index for manipulating the at least one beam path.

The above-mentioned features can also be obtained by a non-volatile, computer-readable storage medium comprising a program for carrying out the method according to an embodiment of the invention.

The methods according to embodiments of the invention, the apparatus according to an embodiment of the invention, and the non-volatile, computer-readable storage medium according to an embodiment of the invention for carrying out the methods thus have the advantage that they make a rapid, gentle, deterministic and non-iterative manipulation of at least one beam path of a microscope based on the refractive index of the sample and/or of the immersion medium possible.

The methods according to embodiments of the invention, the apparatus according to an embodiment of the invention, and the non-volatile, computer-readable storage medium according to an embodiment of the invention can each be further improved by specific configurations. Individual technical features of the configurations of the invention can here be combined and/or omitted as desired, provided the technical effect achieved by way of the omitted technical feature is not crucial.

The methods according to embodiments of the invention can be used for almost arbitrarily manipulating the at least one beam path, but can also be used in particular for compensating at least one imaging aberration introduced by the sample and/or the optical medium.

Compared to solutions from the prior art, the abovementioned methods according to embodiments of the invention, the apparatus according to an embodiment of the invention, and the storage medium according to an embodiment of the invention have the advantage that the refractive index of a sample and/or of the immersion medium surrounding the sample can be measured automatically and is quantitatively obtained based on the measured refractive index, i.e. deterministically, not based on iterative methods and in particular without the recording of images. For this purpose, it is not necessary for a sample to be arranged in a sample volume, with the result that the methods according to embodiments of the invention or the apparatus according to an embodiment of the invention is gentle on the sample. In addition, the methods according to embodiments of the invention are contactless.

An immersion medium is understood to mean the medium that can be located in a sample volume and in particular located in said sample volume such that it surrounds a sample. The immersion medium can likewise be located in the region between the sample and a front lens of a corresponding objective.

The beam path that is to be manipulated, in particular of a light-sheet microscope, can be for example an illumination beam path and/or a detection beam path. With preference, both beam paths for illumination and detection are manipulated; in particular it is possible to compensate aberrations occurring for the respective beam path.

An optical medium is understood to be a material that is transparent to the wavelength or wavelengths used in the microscope and that has an optical property that is characteristic of said wavelength, such as refractive index and dispersion. The optical medium can comprise in particular, and without being limited thereto, the abovementioned alcohol-based or sugar-based immersion media, but also water, glycerol, and air. Consequently, the methods according to embodiments of the invention or the apparatus according to an embodiment of the invention is also usable without an immersion medium (the objectives are located in air).

A simple configuration of the method according to an embodiment of the invention can be achieved in that the ascertainment of the refractive index of the sample arranged in the sample volume and/or of the optical medium arranged in the sample volume comprises the method step of inputting the corresponding values by way of a user. In such a configuration, the user can, for example, select the refractive index from a selection list of specified immersion media or input a user-defined refractive index. In this way, it is possible for repeated measurements with an immersion medium that has already been used before and is thus known to accelerate the adaptation to exactly that immersion medium.

In a further configuration, the method for recording image stacks can comprise the following steps: (8a) displacing a focal plane of a first optical arrangement by a preset scanning distance; (8b) manipulating the at least one beam path of the first optical arrangement in accordance with a configuration of the method according to an embodiment of the invention for manipulating a beam path in a microscope for correcting imaging aberrations of the first optical arrangement; and (8c) displacing or adjusting the focal plane of a second optical arrangement by an adjustment distance that is dependent on the refractive index that was ascertained in method step (8b).

In an advantageous configuration of the method, said method can comprise recording and/or storing an image for generating the image stacks. In particular, a number n of images that form the image stack can be recorded and/or stored. All the images of the image stack are preferably recorded with corrected imaging aberrations, i.e. after the respective beam path has been manipulated.

The method mentioned above for recording image stacks can be improved in a further configuration by way of additionally performing, in method step (8c), the step of manipulating the at least one beam path of the second optical arrangement in accordance with a configuration of the method according to an embodiment of the invention for manipulating a beam path in a microscope for correcting imaging aberrations of the second optical arrangement. In this way, both the illumination beam path and the detection beam path in a microscope can be adapted to the unknown medium, in particular to the refractive index thereof.

In a further possible configuration of the method according to an embodiment of the invention for recording image stacks, the method steps (8a), (8b) and (8c) can be repeated in a modified form. For example, it is possible that, in the method step (8b) of manipulating the at least one beam path of the first optical arrangement, the refractive index is not ascertained again in a second performance of the method steps (8a)-(8c). As a result, a modified method step (8b)' may include only the method step of setting at least one microscope parameter in dependence on the ascertained refractive index for manipulating the beam path. The refractive index in such a case was ascertained the first time method step (8b) was performed. This has the advantage that, when recording image stacks, the refractive index is ascertained only for the recording of the first image, whereas the recording of further images of the image stack requires no further ascertainment of the refractive index (which has already been ascertained after all). This can accelerate the recording of image stacks.

After the method step (8c), an image is preferably recorded n times, with n representing the total number of the images of the image stack.

After method steps (8a), (8b) and (8c) have been performed, in particular the method steps (8a), (8b)' and (8c) can be repeated any number of times (n times) depending on the desired number of the images of the image stack. The ascertainment of the refractive index in this case does not necessarily need to be repeated before each image recording.

However, in a further configuration of the method for recording image stacks, in each case the method steps (8a), (8b) and (8c) can be performed as often as desired according to the previously specified number of images that are to be recorded, wherein an image can be taken in each case after the method step (8c). This configuration of the method according to an embodiment of the invention can be preferably used in samples having a high (or detectable) refractive index gradient. Consequently, any imaging aberrations can be corrected for every plane that is recorded.

If a change in refractive index within the volume, which includes the image stacks, is negligible, ascertaining the refractive index once in method step (8b) can thus accelerate the method because the ascertainment of the refractive index does not need to be repeated for every further image recording.

In a further configuration of the method according to an embodiment of the invention for recording image stacks, a refractive index can be captured before an image is first captured, as soon as a user has introduced a sample into the microscope. Various triggers are conceivable here, for example a trigger started by a computer as soon as a new project is begun by the user. Likewise, the measurement can be triggered manually. This can be done in particular preferably before the user views the preview images that are necessary for the user to orient themselves in the sample and to perform a measurement (that is to say the recording of the image stack) based on the preview images. That is to say that the correction takes place already during a phase of the orientation, that is to say before the actual measurement (recording of the image stack). The value of the refractive index ascertained in this phase of orientation can be used in the method for recording image stacks with the result that, in this configuration of the method, a separate ascertainment of the refractive index is no longer necessary.

The method therefore comprises the method step of determining and storing the refractive index, wherein the refractive index can be determined and/or stored for different excitation wavelengths and/or deexcitation wavelengths. In the case of a measurement, said stored values of the refractive index, advantageously in connection with calibration data that are stored for the optical arrangement, can have the following advantages:

maintaining the focus of the illumination optical unit, for example if the position of the imaged plane changes relative to the sample or the excitation wavelength changes;

recording the image stack with the correct spatial distance between the recorded images if there is an abrupt change in the refractive index in the detection beam path;

compensating for any residual error when using optical arrangements with correction rings; and correcting the previously mentioned imaging aberrations.

Such a configuration of the method for recording image stacks can thus comprise the following method steps:

b1 measuring and/or storing the refractive index;

b2 capturing a change in the sample position with respect to the optical arrangement (for example the illumination and/or detection optical unit) and/or capturing the change in the excitation wavelength, reading measurement values stored in method step (b1) and/or previously stored calibration data; and b3 setting at least one microscope parameter in dependence on the ascertained refractive index for manipulating the beam path.

Method step (b2) can preferably be carried out at the same time as one of the described changes, or only after the change has been made.

In a further configuration of the method according to an embodiment of the invention, it is possible in said method to set a focus position in dependence on the ascertained refractive index with at least one of the following method steps: changing the effective focal length of at least one objective; or displacing at least one objective along its respective optical axis.

It is thus possible to displace a sample using the methods according to embodiments of the invention, wherein, during this displacement, an interface between the immersion medium in which the sample is embedded and the medium located upstream of the illumination optical unit or of the illumination objective, for example air, is also displaced. In the second step, the illumination beam path can be manipulated with respect to its focus position and any imaging aberrations that may occur can be corrected. In this case, the position of the focus within an image field can with particular preference remain at an unchanged location. By changing the position of the interface, imaging aberrations that have already been corrected can change so that another correction by way of said method is necessary.

If a medium having a different refractive index is also located between a detection optical unit and the sample (for example if the sample is arranged in a cuvette positioned between the illumination objective and the detection objective), the method can be adapted to said further interface in that the detection beam path can additionally be manipulated with respect to its focus position, wherein this manipulation of the detection beam path can also comprise the correction of imaging aberrations of the detection optical unit.

This configuration has the advantage that a manipulation of the focus position can be used to adapt the microscope to the refractive index of the sample itself and/or to the immersion medium surrounding the sample. In particular, the aberrations brought about by the unknown refractive indices can be compensated. Such regulation of the focus position in a light-sheet microscope is particularly advantageous because it is advantageous here if it can be ensured that the focal plane of the detection objective and the illumination plane of the illumination objective can superpose one another, and thus a sharp image representation of the two-dimensional region that is illuminated by the light sheet can be obtained.

The effective focal length of the at least one objective and the focus position should thus be understood to be possible microscope parameters. At least one of said parameters can be set in a corresponding apparatus by way of the beam path manipulator.

In a further configuration of the method according to an embodiment of the invention, it is possible, in dependence on the ascertained refractive index, by manipulating the beam path to correct a spherical imaging aberration by changing an optical path length of a beam path in dependence on the distance from an optical axis.

A spherical imaging aberration occurs in particular for non-paraxial rays of a light beam and increases with the distance from the optical axis. It is therefore possible with this configuration to almost fully illuminate an optical system and to use the aperture thereof in the case of sample sizes having volumes of approximately 1 cm³ and above.

In a further configuration of the method according to an embodiment of the invention, such a spherical imaging aberration may also be compensated only partially or may even be overcompensated.

In a specific configuration of the method according to an embodiment of the invention described above, changing the optical path length can comprise displacing at least one reflective mirror section and/or displacing an interface of a deformable transmissive medium.

In particular, in a further specified configuration, the change in the optical path length can be implemented in accordance with a superposition of the functional relationships $r^2$ and $r^4$ with in each case defined weighting of $r^2$ and $r^4$, with r corresponding to the distance from the optical axis.

In other words, in the method according to an embodiment of the invention, the optical path length (that is to say the sum of individual geometric partial lengths in each case multiplied by the refractive index prevailing over the respective partial lengths) can be increased or reduced in dependence on the distance from the optical axis (that is to say in dependence on r).

The change in the optical path length can be denoted with $\Delta x$ and can be described in particular by the mathematical expression $\Delta x = A*r^2 + B*r^4$. Here, r is the distance from the optical axis in the pupil of the observed optical system, and A and B are freely selectable pre-exponential factors allowing weighting of the quadratic or quartic (biquadratic) part. A change in the optical path length described by this mathematical expression can thus be used to compensate the occurring spherical aberration in the medium and/or in the sample of unknown refractive index. The third-order spherical aberration (when describing aberrations using Zernicke polynomials) is described by means of quadratic and quartic parts. These can be compensated with the methods according to embodiments of the invention or the apparatus according to an embodiment of the invention of this configuration.

In the corresponding configuration of the apparatus according to the invention, the beam path manipulator can comprise at least one element from the following group: (a) an optical element with an electrically settable focal length; (b) an actuator module for displacing at least one optical arrangement; (c) a correction ring; (d) a correction plate module for introducing correction plates into the beam path; (e) an objective equipped with a correction ring; (f) a deformable mirror; and (g) a hollow element, filled with a transparent liquid medium, with at least one transparent entrance and/or exit face, wherein the at least one transparent entrance and/or exit face is deformable.

The element (a), (f) and the element (g) can be configured to vary the effective focal length of at least one objective. The element (b) can be configured to displace at least one objective along the respective optical axis thereof.

The elements (c), (d) and (e) can be configured to imprint spherical aberrations onto a beam path, that is to say in particular to correct a beam path that already has spherical aberration with an opposite spherical aberration.

The elements (f) and (g) can be used to introduce both a change in the optical path length in dependence on the distance from the optical axis and (additionally or alternatively) to change the effective focal length of the corresponding objective.

A specific configuration of the element (a) can be an electrically tunable lens (ETL), and element (d) can in particular introduce correction plates into the beam path for correcting spherical aberrations and/or defocus.

The elements (a), (b), (f) and (g) are variably settable and consequently allow greater flexibility of the apparatus according to an embodiment of the invention or of the application of the methods according to embodiments of the invention. In particular, the entrance and/or exit face can be deformed with the element (g) such that the radial thickness profile thereof can correspond to a superposition of the functional relationships $r^2$ and $r^4$ with in each case a defined weighting of $r^2$ and $r^4$.

Since the above elements (a)-(g) differ both in the dynamic range (that is to say the range of the optical wavelength that can be varied) and in their speed, it is advantageously possible to combine various beam path manipulators with one another. In a possible configuration, for example, the slow correction of a fundamental imaging aberration is possible by way of a correction ring (c). In particular, the correction is possible by means of said correction ring to a specific refraction index n, wherein this slow correction takes place with a high dynamic range. The slow correction can be combined for example with the element (g), which may not have the same dynamic range as the correction ring but allows a much faster correction of a residual error. This can be advantageous for example if a correction ring does not take into account the dispersion of all materials used and thus has a residual error that can be compensated by a second component.

In an advantageous configuration of the method according to an embodiment of the invention for recording image stacks, the above elements can be advantageously used for at least one and preferably all method steps of the method for recording image stacks. For example, in method step (8a), the focal plane of the detection optical unit can be displaced by means of a deformable mirror, and one and the same deformable mirror is likewise used in the method step (8b) for manipulating the beam path of the detection optical unit. Imaging aberrations of the detection optical unit can thereby be corrected. An adjustment of the focal plane of the second optical arrangement, in this case the illumination objective, can be effected with a further deformable mirror. Alternatively, a tilt mirror can be used instead of the further deformable mirror.

The method according to an embodiment of the invention can be further improved by manipulating the beam path in a wavelength-dependent manner by way of the following method steps: (A) manipulating the beam path of light of a first wavelength in accordance with a configuration of the method according to an embodiment of the invention described above; and (B) setting at least one further wavelength and in each case sequentially manipulating the beam path of light of said further wavelength in accordance with a configuration of the method according to an embodiment of the invention described above.

In a variation of this method, method step (B) may include only the setting of at least one further wavelength, with the result that, even in the case of the further wavelength, the beam path of light of said further wavelength is based on the refractive index measured in method step (A) for the first wavelength.

It is likewise conceivable that a further configuration of the method according to an embodiment of the invention comprises the following method steps: (A') ascertaining the refractive index of the sample arranged in the sample volume and/or of the optical medium, arranged in the sample volume, for light of the first wavelength; (B') setting at least one further wavelength and in each case sequentially ascertaining the refractive index of the sample arranged in the sample volume and/or of the optical medium, arranged in the sample volume, for light of said second wavelength; (C') manipulating the beam path of light of the first wavelength and of the at least one further wavelength in accordance with a configuration of the method according to an embodiment of the invention described above.

Such a wavelength-dependent correction can be effected with the typically wavelength-independent correction elements, such as a deformable mirror or an ETL. If these are used as opposed to the use of a correction ring, the correction generally cannot simultaneously correct the different chromatic aberrations for a plurality of wavelengths. In such a case, the recording can be effected sequentially at different wavelengths, wherein the clearly faster elements, such as deformable mirrors or ETL, can here minimize any time losses of the sequential recording on account of their switching times of for example significantly less than 10 ms.

It should be mentioned at this point that even a correction ring that permits for example adaptation to media having different refractive indices can correct only in each case one specific dispersion for the different refractive indices, that is to say in the case of water and with a light wavelength of approximately 500 nm (green light) with n=1.33 the dispersion thereof, and in the case of glycerol with n=1.42 the dispersion thereof, but not in the case of the respective refractive indices of substances with deviating dispersion. The number of the substances with different refractive index having a dispersion which can be corrected at the respective refractive index is likewise limited, for example it is not possible at n=1.33, n=1.37, n=1.41, n=1.45 etc. to correct in each case a different dispersion of the medium.

In the method, in particular in the case of wavelengths that were previously defined (by the user), the refractive index can be determined and, after this measurement, the wavelength-dependent corrections and manipulations in the at least one beam path, for example illumination and detection beam path, can take place.

The method according to an embodiment of the invention can furthermore be improved by provision being made for this to be repeated at specified time intervals.

This can be advantageous in particular for samples and/or immersion media in which a temporal change in the refractive index should be expected, for example on account of evaporation. It is furthermore possible with this configuration for changes in the sample and/or in the immersion medium surrounding the sample to be captured and correspondingly corrected during the observation of living samples.

In one configuration of the corresponding apparatus, a timer module can be provided, which outputs at specified temporal intervals a starting signal for starting the measurement and/or manipulation of the at least one beam path.

In a further configuration of the method according to an embodiment of the invention, the ascertainment of the refractive index of the sample and/or of the optical medium arranged in the sample volume can comprise the following method steps:
  (i) focusing measurement light into the sample volume using an optical arrangement, wherein the measurement light is transmitted on a sample side of the optical arrangement by the optical medium and a further optical medium;
  (ii) detecting the measurement light that is reflected by a reflective element and is transmitted by a further optical arrangement or by the optical arrangement, using a detector arrangement;
  (iii) ascertaining a working distance between the optical arrangement and the reflective element based on the measurement light detected by the detector, wherein, for the working distance, the focus of the measurement light lies on the reflector;
  (iv) varying at least one of the following parameters:
    distance between the optical arrangement and the sample medium;
    distance between the reflector and the further optical medium;
    divergence of the measurement light,
    wherein the varying results in a fixed distance change of a focus position of the measurement light;
  (v) ascertaining a further working distance according to method steps (i) to (iii);
  (vi) ascertaining a working distance change between the working distance and the further working distance; and
  (vii) ascertaining the refractive index based on the distance change and the working distance change.

This configuration, in particular the configuration of the method steps for ascertaining the refractive index of the sample, is advantageous because it allows the measurement of the refractive index without a sample or a scattering medium in the sample volume.

The method according to an embodiment of the invention can, alternatively or additionally, furthermore comprise the following method steps for ascertaining the refractive index of the sample and/or of the optical medium arranged in the sample volume:
  I. oblique irradiation of the sample volume with measurement light with respect to the optical axis using an optical arrangement;
  II. reflecting the irradiating light at a reflective element provided in the sample volume at a first position;
  III. imaging the reflected light onto a spatially resolving detector;
  IV. evaluating the signal detected by the detector with respect to the size and/or offset of the reflected light on the spatially resolving detector;
  V. displacing the reflective element along the optical axis to a second position and performing the method steps (III) and (IV); and
  VI. ascertaining the refractive index based on the size and/or the offset of the reflected light for the first and the second position of the reflective element.

If the above method is performed only up to method step (d), the size of the focus on the spatially resolving detector can thus already provide information relating to the distance of the reflective element from the effective focal plane of the optical arrangement. This distance is dependent on the refractive index of the medium and/or of the sample, and also on the distance traveled by the light in this medium and/or the sample.

If a medium having the refractive index to which the objective is adapted, for example merely air, is located between the optical arrangement and the reflective element, the focus thus lies on the optical axis if the reflective element lies in the focal plane. Such a measurement can be used for calibration purposes. A lateral displacement of the focus on the spatially resolving detector in dependence on the displacement of the reflective element allows the ascertainment of the refractive index.

A further advantageous configuration of the method according to an embodiment of the invention can furthermore comprise reading of calibration data, wherein the at least one microscope parameter can be set in dependence on the ascertained refractive index and/or in dependence on the calibration data that have been read.

A corresponding configuration of the apparatus according to an embodiment of the invention can consequently comprise a storage module in which calibration data of at least one optical arrangement can be stored, wherein said calibration data are retrievable by a control unit.

If in the method according to an embodiment of the invention or in the apparatus according to an embodiment of the invention calibration data are stored, it is known which refractive-index-dependent and wavelength-dependent spherical aberration (or defocus) the optical arrangement has. The refractive index or spherical aberration stored as the correction value can also be stored in dependence on the setting of the correction element used, for example the correction ring. It is thus possible to take into account the correction of these parts in the compensation. In addition to the possibility of obtaining these data by means of the method according to an embodiment of the invention, said element-specific values can, however, also be provided "ex works," because these are permanent properties (except for the dependence on the wavelength and/or on the refractive index stored in the calibration data) of the optical arrangement. Such calibration data can be provided in principle for all the optical elements used in the optical system, that is to say for example the microscope, in other words can be stored in the storage unit.

A control unit of the apparatus according to an embodiment of the invention can furthermore be configured to automatically or manually measure the refractive index of the sample and/or of the immersion medium and to manipulate the at least one beam path in the microscope in dependence on the ascertained refractive index such that said beam path is adapted to the ascertained refractive index. With particular preference it is possible to compensate aberrations that occur, such as defocus or spherical aberration, by way of the manipulation of the beam path. The control unit can thus be configured for ascertaining the refractive index and for controlling the least one beam path manipulator.

It is likewise possible that a personal computer that reads the non-volatile storage medium controls the method steps of the method according to an embodiment of the invention and calculates for example the refractive index. Since microscopes from the prior art increasingly exhibit computer-based control and/or evaluation, the non-volatile, computer-readable storage medium according to an embodiment of the invention is particularly advantageous because it allows the improvement of existing microscopes. Generally, the microscopes from the prior art can additionally already have specific configurations of possible beam path manipulators, such as actuators and correction ring, which can be used during the performance of the method according to an embodiment of the invention.

The present subject of embodiments of the invention will be described in more detail below with reference to exemplary drawings. The drawings show examples of advantageous configurations of embodiments of the invention, wherein technical features of the respective configurations can be combined and/or omitted as desired, provided the technical effect achieved by way of the respective omitted technical feature is not crucial. Identical technical features and technical features having the same function are provided with the same reference sign for the sake of clarity.

FIG. 1 shows a microscope 1 that is configured as a confocal microscope 3 or a light-sheet microscope 5. The microscope 1 comprises an optical arrangement 9 that is configured in the form of an illumination objective 7, said optical arrangement 9 transmitting illumination light 11 of an excitation wavelength 239 from an illumination side 13 of the illumination objective 7 along a beam path 8 to a sample side 15 of the illumination objective 7 and focusing the illumination light 11 in a sample volume 17 that is illustrated by way of a dashed line. The beam path 8 of the illumination objective is an illumination beam path 8a.

Within a sample 21, a focus 19 is formed, wherein the sample 21 is located in a sample vessel 25 filled with immersion liquid 23. The focus 19 defines a focal plane, which is also referred to by the reference sign 19.

The immersion liquid 23 can be understood to be a sample medium 27 having a refractive index n.

An optical system 29 comprising the optical arrangement 9, the sample vessel 25, and the sample medium 27 contained therein is influenced by the refractive index n of the sample medium 27 to the effect that a spatial position 31 of the focus 19 can vary for different refractive indices n.

On the sample side 15 of the optical arrangement 9, the illumination light 11 travels through a free-beam volume 33, which is indicated by a dotted line.

Both in the free-beam volume 33 and in the sample vessel 25, there is an optical medium 35 which is air 37 in the free-beam volume 33 in the example shown and is the sample medium 27 in the sample vessel 25.

The air 37 in the free-beam volume 33 corresponds to a further optical medium 39 having the refractive index $n_1$. The sample medium 27 has the refractive index $n_2$, and the sample 21 has the refractive index $n_3$. All refractive indices $n_1$-$n_3$ can differ from one another.

The microscope 1 shown in FIG. 1 furthermore comprises a detection optical unit 41, which is known from the prior art and will thus not be described in detail.

In the adjusted state 43, the focus 19 of the illumination light 11 along an optical axis 53 lies exactly in a focal plane 45 of the detection optical unit 41 and, along the illumination direction (parallel to the focal plane 45), centrally in the image field. On account of changes in the refractive index n, deviations from the adjusted state 43 may occur, with the result that a sharp image representation can no longer be attained with the microscope 1.

In particular, the microscope 1 shown in FIG. 1 is able to be used both as a confocal microscope 3 and as a light-sheet microscope 5. When it is used as a light-sheet microscope 5 (this is shown in FIG. 1), the microscope 1 has a reflective surface 47 of a reflective element 49 arranged in the sample volume 17, wherein the reflective element 49 is arranged at and attached to a detection objective 51 of the detection optical unit 41. The reflective element 49 consequently represents a reflector 55.

In addition to the inclined reflective surface 47, at which the illumination light 11 is reflected in FIG. 1, the reflective element 49 has a further reflective surface 47, which is oriented substantially perpendicular to an optical axis 53 of the optical arrangement 9 and of the detection objective 51. In the configuration of the microscope 1 shown in FIG. 1, the optical axes 53 of the optical arrangement 9 and of the detection objective 51 coincide, and can be arranged parallel to one another in other configurations (see FIG. 3 or FIG. 4).

Figure 2:
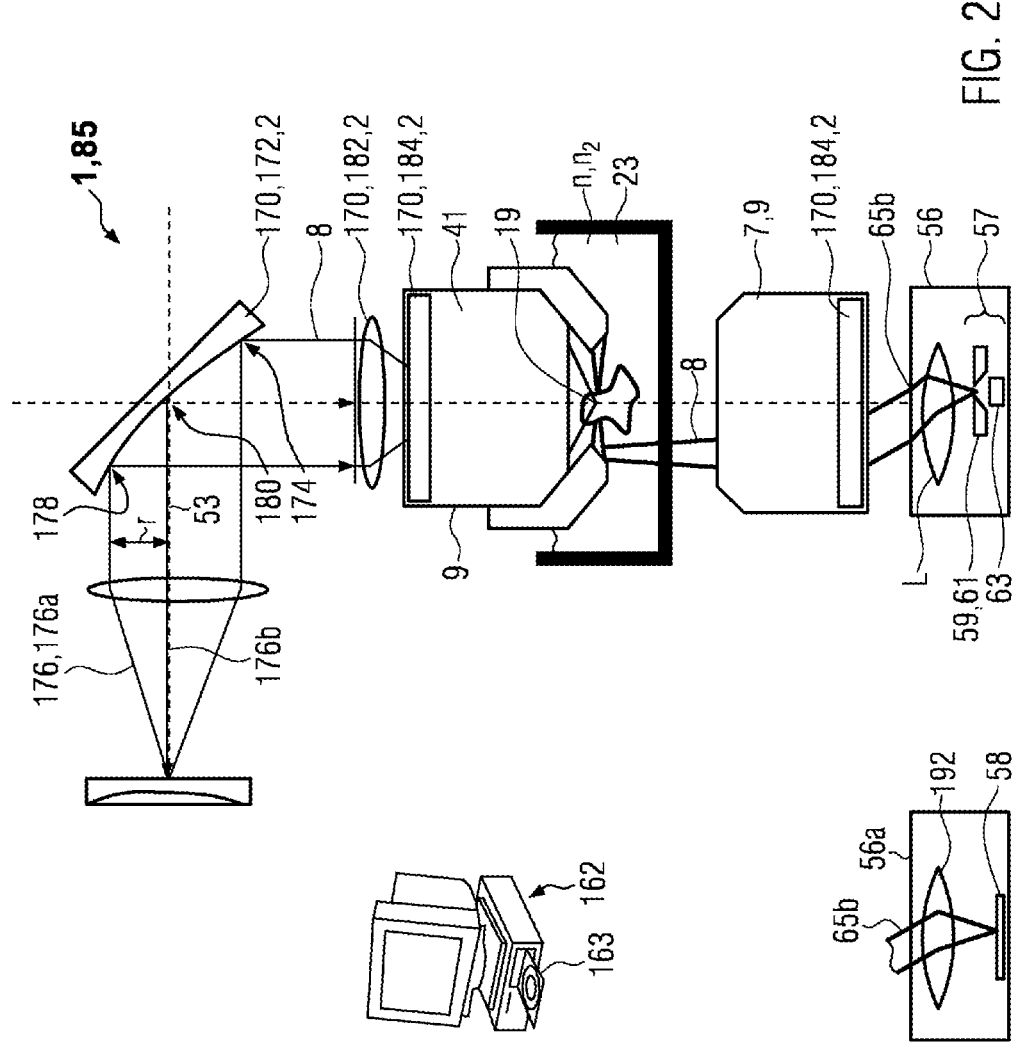
FIG. 2 shows an apparatus according to an embodiment of the invention.

FIG. 2 shows the schematic construction of an apparatus 85 for manipulating at least one beam path 8 configured as the microscope 1.

FIG. 2 also shows a PC 162 that is used for controlling the apparatus 85 according to an embodiment of the invention, configured in the form of microscope 1, and reads a program for carrying out the methods according to embodiments of the invention from a non-volatile computer-readable storage medium 163 and executes it.

Instead of a PC 162, a mini computer, for example an Arduino, can also be used. Such a mini computer can be provided for example in addition to a PC that is used for controlling the microscope. In the PC 162 or the mini computer, a storage device can be provided that has calibration data of the optical arrangement and/or of correction elements used and makes them available to the microscope for the manipulation of the beam path.

In addition to the construction shown in FIG. 1, the microscope has a refractive-index ascertainment module 56, which is illustrated schematically in the form of a rectangle. The refractive-index ascertainment module 56 can comprise a detector arrangement 57, which in turn can comprise a stop 59, for example in the form of a pinhole 61 and a detector 63.

In a second configuration of the refractive-index ascertainment module 56a (shown on the left in FIG. 2), a spatially resolving detector 58 can be used instead of the detector arrangement 57. In both cases, measurement light 65b that is reflected back along the beam path 8 is focused through a lens 192 on the detector 63 or the spatially resolving detector 58.

It should be noted that FIGS. 3 and 4 show measurement light 65 that is referred to as irradiating measurement light 65a, which is reflected at the reflective element 49 and passes to the refractive-index ascertainment module 56 or 56a as said reflected measurement light 65b.

The apparatus 85 of FIG. 2 furthermore has a plurality of beam path manipulators 170. In particular, these are a deformable mirror 172, which has an (at least partially) variably settable curvature 174 and permits in particular for the beam path 8 of the detection optical unit 41 a decrease or increase of optical wavelengths 176 in peripheral regions 178 of the deformable mirror 172, that is to say of outer optical path lengths 176a as compared to optical path lengths 176 at a center 180 of the beam path 8, that is to say the central optical path lengths 176b.

The apparatus 85 of FIG. 2 furthermore comprises an optical element having an electrically settable focal length 182, in short ETL. It is possible with the ETL 182 to vary an effective focal length of the detection optical unit 41 and to thus compensate an offset of the focus 19 of the detection optical unit 41 that is dependent on the refractive index $n_2$ of the immersion liquid 23.

It is possible with the beam path manipulators 170 to consequently set microscope parameters 2, such as for example the spherical aberration or the effective focal length.

Both the detection optical unit 41 and the illumination objective 7 comprise a correction ring 184, which is shown merely schematically in FIG. 2 in the form of a rectangle.

The beam path manipulators 170 shown in FIG. 2 can be provided in various configurations of the apparatus 85 in different combinations. That is to say that the deformable mirror 172, the ETL 182, and the correction ring or rings 184 are optional.

While the ETL 182 can substantially correct an offset of the focus 19, both the deformable mirror 172 and a correction ring 184 are able to vary optical path lengths 176, in particular in dependence on a distance r from the optical axis 53.

FIGS. 3 and 4 show a schematic illustration of an apparatus 85 according to an embodiment of the invention, in particular of a first measurement method for determining the refractive index n.

The apparatus 85 comprises the optical arrangement 9, which can perform a translation 89 by means of an actuator module 87, the reflective element 49, which images reflected measurement light 65b onto a measurement surface of the detector arrangement 57 or on the spatially resolving detector 58 (see FIG. 2) by means of the optical arrangement 9, if the reflective element 49 is positioned at a working distance 79 from the optical arrangement 9. In this configuration, the optical arrangement 9 is identical to a further optical arrangement 9a.

The detection optical unit 41 shown has an image field 237, which is preferably substantially maintained, that is to say is not changed, even during the manipulation of a beam path.

A distance 93 between the reflector 55 and the focus 19 of the measurement light 65 can be varied by means of at least one of the actuator modules 87.

A schematic illustration in FIG. 3 shows the case in which the focus 19 of the measurement light 65 is arranged at a distance from the reflective element 49 and the distance 93 between the reflective element 49 and the focus 19 of the measurement light 65 can be measured.

The apparatus 85 furthermore comprises an evaluation unit 95, which is illustrated in detail only for the apparatus 85 of FIG. 4. The evaluation unit 95 is connected to the detector arrangement 57 or the spatially resolving detector 58 (illustrated merely schematically by a rectangle) for data transmission via data lines 97, and includes a working-distance ascertainment module 99 and a refractive index module 101 for determining the refractive index n, wherein the refractive index module 101 is connected for data transmission to the actuator module 87 or the actuator modules 87 and the working-distance ascertainment module 99, wherein this connection is implemented centrally by a controller 103, that is to say a control unit. In other configurations, refractive index module 101 can be connected directly to the actuator modules 87.

The controller 103 can receive a trigger signal 241, which can be generated by introducing the sample into the microscope by a computer on starting a new project or manually by the user. The trigger signal 241, which is illustrated in encoded fashion, can effect the start of a method according to an embodiment of the invention.

The evaluation unit 95 can be a part of the refractive-index ascertainment module 56.

Furthermore, the working-distance ascertainment module 99 is also connected to the actuator modules 87 via the controller 103. The controller 103 can additionally be connected for data transmission to the least one beam path manipulator 170 (see FIG. 2) by at least one further manipulation output 186. In the configuration shown, the controller is connected to the beam path manipulator 170 that is configured as the actuator module 87.

Both the working-distance ascertainment module 99 and the refractive index module 101 have a data output 105.

The evaluation unit 95 can furthermore comprise a storage unit 107, in which for example a previously defined function 109 or measurement values 111 are stored or can be stored. In addition, calibration data 188 that capture for example possible imaging aberrations of the optical units used, such as the illumination objective 7 and/or the detection optical unit 41, can be stored in the storage unit 107, with the result that they can be taken into account in accordance with the method according to an embodiment of the invention or the apparatus according to an embodiment of the invention when manipulating the beam path 8. In particular in the case of objectives having a correction element it is possible for example for the color dependence that is present for various settings of the refractive index n to be stored. In tunable lenses it is possible for example for the deviation from an ideal lens in dependence on the set focal length to be stored.

The reflective element 49 of FIGS. 3 and 4 is located at a distance 113 from the interface 235 between the optical medium 35 and the further optical medium 39 (in this case air 37). For the sake of simplicity, a wall 115 of the sample vessel 25 is considered to be infinitesimally thin and is not taken into account.

The optical arrangement 9 is located at a distance 117 from the sample medium 27 (the wall 115 is not taken into account here either).

Substantially, the state of FIG. 4 can be obtained from the state of FIG. 3 by increasing the distance 117 between the optical arrangement 9 and the sample medium 27 and subsequently adjusting the actuator module 87 of the detection optical unit 41 so as to follow the optical arrangement 9; or by decreasing the distance 113 between the reflector 55 and the further optical medium 39 and subsequently moving the optical arrangement 9 away from the reflector 55 by way of the actuator module 87.

The case a) is shown in FIG. 3 with reference to the section 119. It can be seen here that the varying of the distance 117 between the optical arrangement 9 and the sample medium 27 results in a fixed, i.e. measurable, distance change 121 of a focus position 123 of the measurement light 65.

In FIG. 3, the reflective element 49 is located at the working distance 79 of the optical arrangement 9, whereas in FIG. 4, at least one parameter 125, comprising the distance 113 and the distance 117, was varied to set a further working distance 127.

The working distance 79 in FIG. 3 and the further working distance 127 in FIG. 4 are transmitted to the controller 103 in the form of a working distance value 131 (schematically illustrated by an electric signal) by the working-distance ascertainment module 99, wherein the controller calculates from the working distance value 131 of the working distance 79 and the working distance value 131 of the further working distance 127, via a computation module, a working distance change 129 that is transmitted to the refractive index module 101 in the form of a working distance change value 133. The controller 103 furthermore ascertains, on the basis of the data-transmitting connection to the actuator modules 87, the distance change 121 and transmits it to the refractive index module 101 in the form of a distance change value 135. The distance change value 135 is shown schematically in FIG. 4, purely by way of example for differentiating purposes, in the form of triangular pulses.

Based on the working distance value 133 and the distance change value 135, the refractive index module 101 calculates the refractive index n or a measurement value that is proportional to the refractive index n and makes it available at the data output 105 in the form of a refractive index value 137. The refractive index value 137 is schematically illustrated by way of a sine wave for differentiating purposes.

FIG. 5 is intended to be used to illustrate a possibility for ascertaining the working distance 79. It shows a variable 145 detected by the detector arrangement 57, which variable (such as for example a voltage or a current) is shown as a function of the distance change 121 for both the working distance 79 and for the further working distance 127. More specifically, FIG. 5 shows in each case the previously defined function 109 that has been adapted to the measurement values 111, wherein the previously defined function 109 is illustrated by way of a Gaussian function 147.

The Gaussian function 147 has merely two parameters 125, specifically a full width at half maximum 149 and a center 151, wherein the center is located at an extreme value 153 of the Gaussian function 147. For the Gaussian function 147, the number N of parameters 125 is two. If other previously defined functions 109 are used, the number of necessary measurement values 111 corresponds to the number N of parameters 125 of the function 109 used.

The Gaussian functions 147, which are drawn differently, permit the calculation of the working distance 79 and also the further working distance 127 and a resulting working distance change 129. The refractive index module 101 (see FIG. 4) can calculate the refractive index n from the working distance change 129 and the distance change 121.

Figure 6:
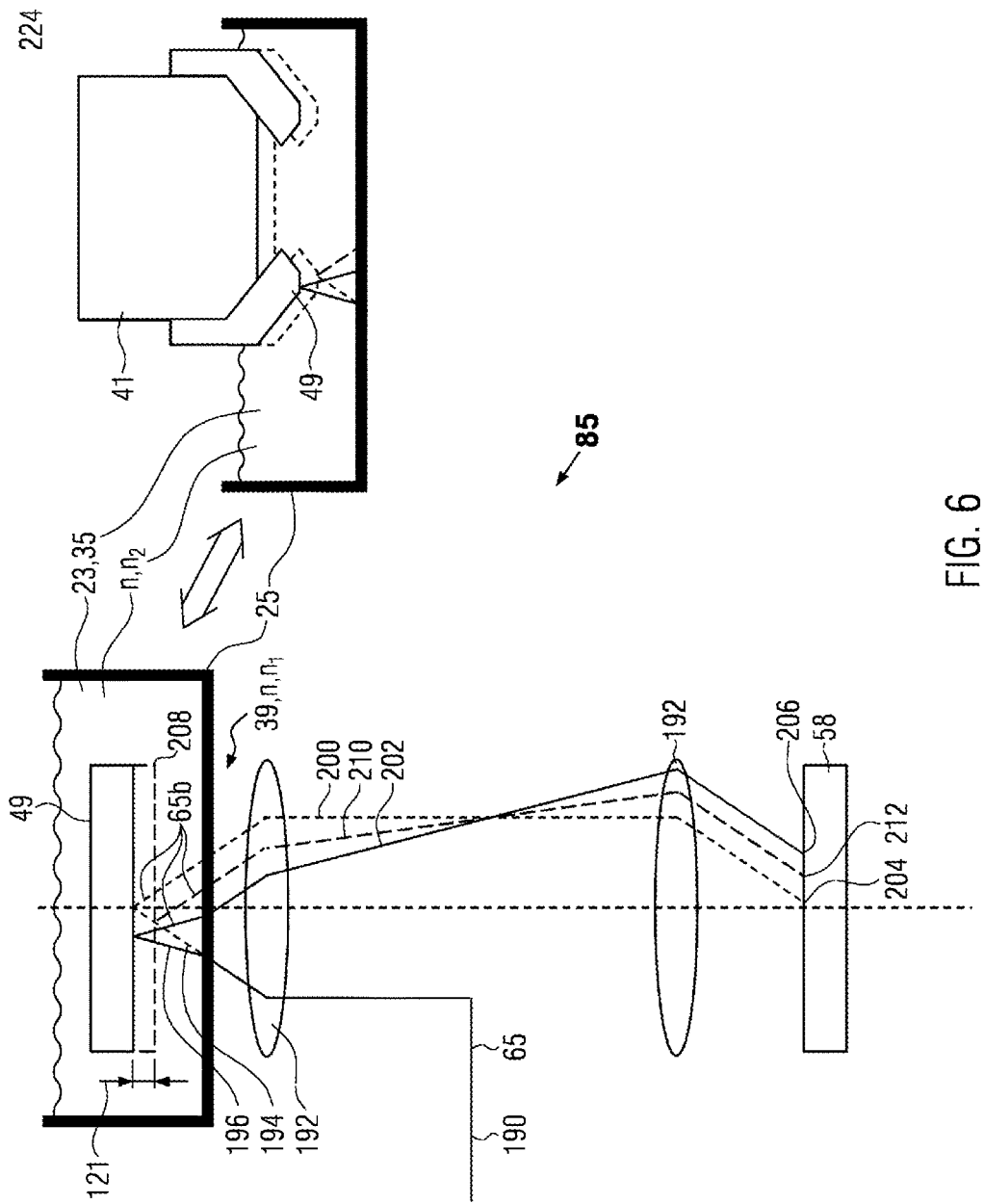
FIG. 6 shows the method step for determining the refractive index according to a second measurement method.

FIG. 6 shows a detail of the apparatus 85 according to an embodiment of the invention, in particular shows a second measurement method for determining the refractive index n.

It shows the reflective element 49, which can be located as shown on the right directly at the detection optical unit 41, wherein the reflective element 49 is located in the immersion liquid 23, that is to say the optical medium 35.

The measurement light 65 is introduced into the sample vessel 25, in which the optical medium 35 is located, via the lens 192 via a detection beam path 190.

If the further optical medium 39, which is located between the lens 192 and the sample vessel 25, has the same refractive index $n_1$ as the optical medium 35 (that is to say $n_1=n_2$), a first immersion beam path 194 is obtained, which is illustrated in short dashes.

If the further optical medium 39 is more optically dense than the optical medium 35 (that is to say $n_1>n_2$), the detection beam path 190 is interrupted and a second immersion beam path 196, drawn with a solid line, is obtained.

In both cases, the respective immersion beam path 194, 196 is incident on the reflective element 49 and is reflected thereby, with the result that the reflected measurement light 65*b* is guided along a respective measurement beam path 198 to the spatially resolving detector 58. This can likewise be done by a lens 192, which focuses the reflected measurement light 65*b*.

If a first measurement beam path 200, resulting from the first immersion beam path 194, is considered and compared to a second measurement beam path 202 that results from the second immersion beam path 196, it thus becomes clear that a second point of incidence 206 of the second measurement beam path 202 occurs with a lateral offset with respect to a first point of incidence 204 of the first measurement beam path 200 on the spatially resolving detector 58.

If in addition the reflective element 49 is moved into a second position 208, illustrated by a dotted line, a third measurement beam path 210 is obtained, which is incident in a third point of incidence 212 on the spatially resolving detector 58. The evaluation of the points of incidence 204, 206, 212 and in particular the change between them provides, in dependence on the distance change 121 of the reflective element 49, the refractive index $n_2$ of the optical medium 35.

It is furthermore possible to also realize the setting of an autofocus with the method illustrated schematically in FIG. 6. This is known from the prior art and shall not be explained in more detail here.

Figure 8:
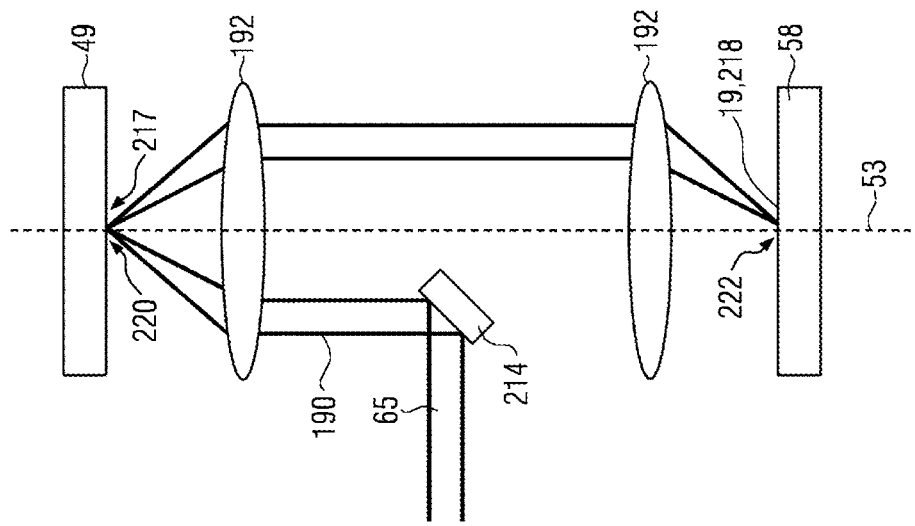
FIGS. 7 and 8 show possible configurations of the beam paths in the determination of the refractive index according to the second measurement method.
Figure 7:
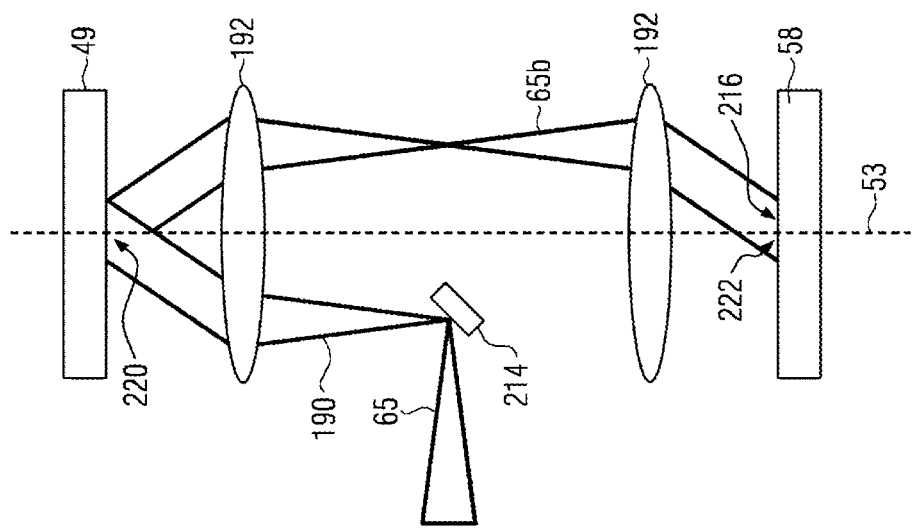

FIGS. 7 and 8 show possible configurations of the beam path 8 (illustrated in a simplified manner) in the determination of the refractive index in accordance with the second measurement method of FIG. 6. For the sake of simplicity, no sample vessel is shown, and the reflection of the detection beam path 190 occurs at a position of the reflective element 49.

In addition to the construction shown in FIG. 6, the figures show a deflection mirror 214 that deflects the measurement light 65 toward the reflective element 49.

The detection beam paths 190 differ in that in FIG. 7 it is focused at the deflection mirror 214. The result of this is that the reflected measurement light 65b is incident on the spatially resolving detector 58 in collimated fashion owing to the two lenses 192.

The change in refractive index n in this configuration has the result that a wide light spot 216 changes its position in its totality on the spatially resolving detector 58. If additionally the reflective element 49 is moved along the optical axis 53, this results in a reduction or enlargement of the wide light spot 216.

In the configuration of the detection beam path 190 of FIG. 8, by contrast, the latter is incident in a collimated fashion on the deflection mirror 214. By imaging the two lenses 192, first an intermediate focus 217 is formed on the reflective element 49 and secondly a focus 19 or a focused light spot 218 is formed on the spatially resolving detector 58.

In addition to different necessary evaluation algorithms, these two configurations permit the variation of both a light intensity in the sample volume 220 and a light intensity on the detector 222. For example, in the case of very low intensity of the measurement light 65 or a very great attenuation thereof in the sample volume, the configuration of FIG. 8 is preferred.

If the intensity of the measurement light 65 lies in a border region of the dynamic range of the spatially resolving detector 58, the correlation of FIG. 7 is thus advantageous with respect to that of FIG. 8.

Figures 9, 10:
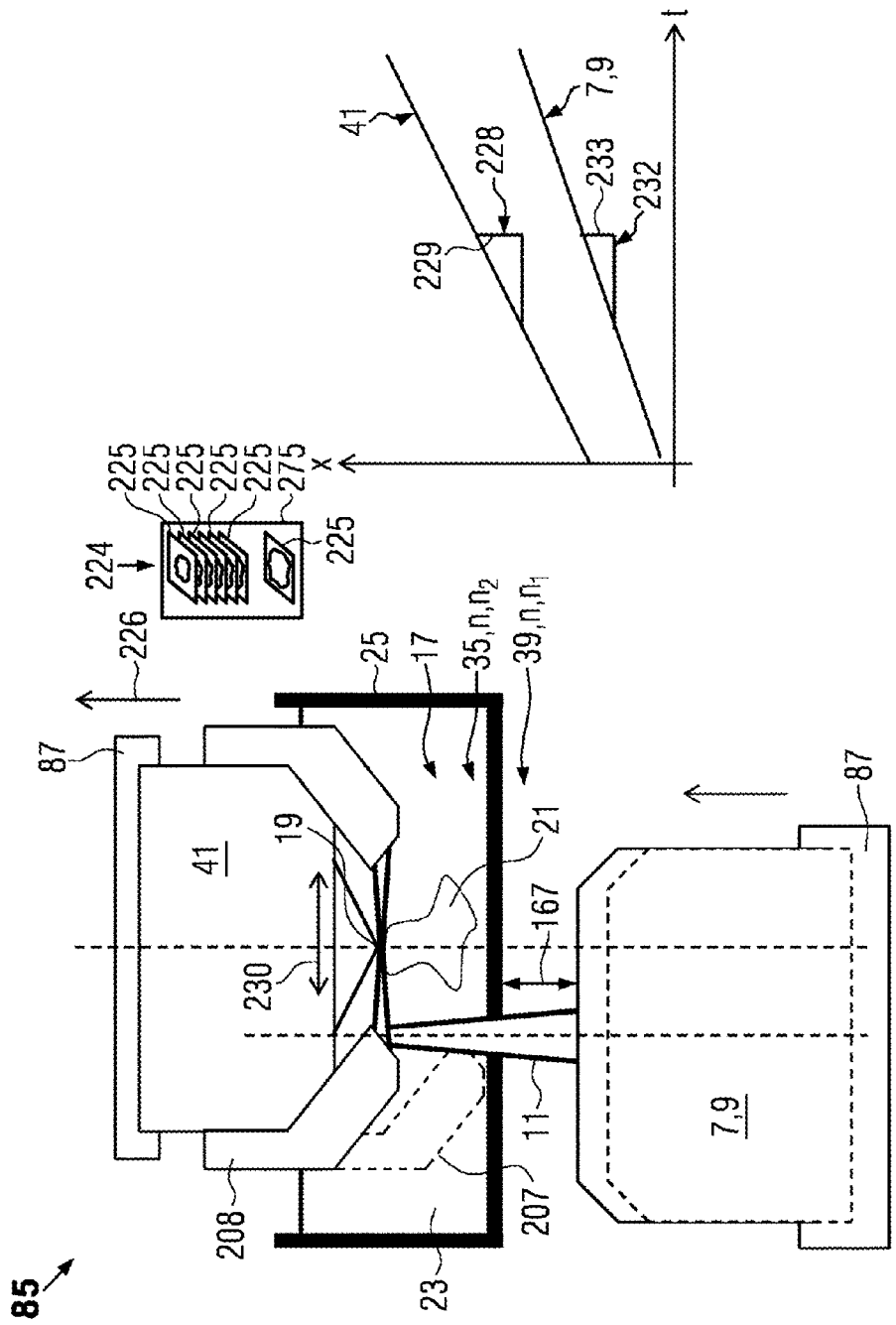
FIGS. 9 and 10 show the method for recording image stacks.

FIGS. 9 and 10 are intended to briefly explain the method for recording image stacks.

They show an apparatus 85 with which a three-dimensional recording is to be made of a sample 21 located in the sample volume 17. This is done by recording an image stack 224, which is illustrated schematically next to the sample vessel 25. The image stack 224 comprises a multiplicity of individual images 225.

To record such an image stack 224, the detection optical unit 41 can be displaced for example in a displacement direction 226. In FIG. 9, the focus 19 of the detection optical unit 41 is already located outside the sample 21, that is to say that it has been displaced from a first position 207 (illustrated in dashes) into the second position 208.

FIG. 10 shows a displacement path x of the detection optical unit 41 over the time t, wherein a first slope 228 is obtained from a scanning distance 229 and the time t, which basically indicates a speed at which the detection optical unit 41 is displaced in the displacement direction 226.

Since, in the case of a fixed illumination objective 7, the focus 19 of the illumination light 11 would have a lateral offset 230, the illumination objective 7 must also be moved in the displacement direction 226. In each case an actuator module 87 can be used for example for both movements.

Since, however, a distance part in the optical medium 165 and a distance part in the further optical medium 167 change relative to one another when the detection optical unit 41 is displaced, the illumination objective 7 must be moved at a second slope 232 in the displacement direction 226 that is lower than the first slope 228. In the same time t, the illumination objective 7 must be moved by an adjustment distance 223. If the optical medium 35 and the further optical medium 39 have the same refractive index $n_2$ and $n_1$, the first slope 228 corresponds to the second slope 232. However, as soon as the refractive index $n_2$ of the optical medium 35 deviates from the refractive index $n_1$ of the further optical medium 39, the slopes 228, 232 differ from one another.

With respect to the method described with the aid of FIGS. 9 and 10 for recording image stacks, the detection optical unit 41 should be considered to be a first optical arrangement 9b and the illumination objective 7 should be considered to be a second optical arrangement 9c.

If in a further configuration of the method firstly the illumination objective 7 is displaced (wherein in this case the illumination objective 7 can be referred to as the first optical arrangement 9b), the detection optical unit 41 is adjusted accordingly in the further method step. In this case, the detection optical unit 41 corresponds to the second optical arrangement 9c.

During the recording of the image stack 224, it is thus possible in a configuration of the method according to an embodiment of the invention in each intermediate position, that is to say in each image of the image stack 224, to measure the refractive index of the sample 21 and/or of the immersion medium 23, while in another configuration of the method according to an embodiment of the invention, the refractive index of the sample 21 and/or of the immersion medium 23 is measured once and the differences in the slopes 228 and 232 are calculated from said refractive index. In particular, in the aforementioned clearing methods, in which the refractive index n of the immersion medium 23 is adapted to that of the sample 21, the configuration of the method according to an embodiment of the invention that was mentioned last is advantageous.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Microscope
2 Microscope parameter
3 Confocal microscope
5 Light-sheet microscope
7 Illumination objective
8 Beam path
8a Illumination beam path
9 Optical arrangement
9a Further optical arrangement
9b First optical arrangement
9c Second optical arrangement
11 Illumination light
13 Illumination side
15 Sample side
17 Sample volume
19 Focus/focal plane
21 Sample
23 Immersion liquid
25 Sample vessel
27 Sample medium
29 Optical system
31 Spatial position
33 Free-beam volume
35 Optical medium
37 Air
39 Further optical medium
41 Detection optical unit
43 Aligned state
45 Focal plane
47 Reflective surface
49 Reflective element
51 Detection objective
53 Optical axis
55 Reflector
56 Refractive-index ascertainment module
56a Second configuration of the refractive-index ascertainment module
57 Detector arrangement
58 Spatially resolving detector
59 Stop
61 Pinhole
63 Detector
65 Measurement light
65a Irradiating measurement light
65b Reflected measurement light
79 Working distance
85 Apparatus
87 Actuator module
89 Translation
93 Distance between reflector and focus of the measurement light
95 Evaluation unit
97 Data line
99 Working-distance ascertainment module
101 Refractive index module
103 Controller
105 Data output
107 Memory unit
109 Previously defined function
111 Measurement value
113 Distance between reflector and further optical medium
115 Wall
117 Distance between optical arrangement and sample medium
119 Detail
121 Distance change
123 Focus position
125 Parameter
127 Further working distance
129 Working distance change
131 Working distance value
133 Working distance change value
135 Distance change value
137 Refractive index value
147 Gaussian function
149 Full width at half maximum
151 Center
153 Extreme value
162 PC
163 Non-volatile computer-readable storage medium
165 Distance portion in the optical medium
167 Distance portion in the further optical medium
170 Beam path manipulator
172 Deformable mirror
174 Curvature
176 Optical path lengths
176a Outer optical path lengths
176b Central optical path length
178 Peripheral region
180 Center
182 Optical element with electrically settable focal length
184 Correction ring
186 Manipulation output
188 Calibration data
190 Detection beam path
192 Lens
194 First immersion beam path
196 Second immersion beam path
198 Measurement beam path
200 First measurement beam path
202 Second measurement beam path
204 First point of incidence
206 Second point of incidence
207 First position
208 Second position
210 Third measurement beam path
212 Third point of incidence
214 Deflection mirror
216 Wide light spot
217 Intermediate focus
218 Focused light spot 220 Light intensity in the sample volume
222 Light intensity on the detector
224 Image stack
225 Image
226 Displacement direction
228 First slope
229 Scanning distance
230 Lateral offset
232 Second slope
233 Adjustment distance
235 Interface
237 Image field
239 Excitation wavelength
241 Trigger signal
n Refractive index
$n_1$ Refractive index of the further optical medium
$n_2$ Refractive index of the sample medium
$n_3$ Refractive index of the sample
r Distance
t Time
x Displacement path

The invention claimed is:

1. A method for manipulating at least one beam path in a microscope, the method comprising:
   determining a refractive index of a sample arranged in a sample volume and/or of an optical medium arranged in the sample volume; and
   setting at least one microscope parameter based on the determined refractive index for manipulating the beam path,
   wherein determining the refractive index of the sample and/or of the optical medium arranged in the sample volume comprises:
   (I) oblique irradiation of the sample volume with measurement light with respect to the optical axis using an optical arrangement;
   (II) reflecting the irradiating light at a reflective element provided in the sample volume at a first position;
   (III) imaging the reflected light onto a spatially resolving detector;
   (IV) evaluating the signal detected by the detector with respect to a size and/or offset of the reflected light on the spatially resolving detector;
   (V) displacing the reflective element along the optical axis to a second position and performing the method steps (III) and (IV); and
   (VI) determining the refractive index based on the size and/or the offset of the reflected light for the first position and the second position of the reflective element.

2. The method as claimed in claim 1, wherein the determination of the refractive index of the sample arranged in the sample volume and/or of the optical medium arranged in the sample volume comprises reading the corresponding values of the refractive index by way of a user.

3. The method as claimed in claim 1, wherein a focal position is set based on the determined refractive index with at least one of the following method steps:
   changing an effective focal length of at least one optical arrangement; or
   displacing at least one optical arrangement along its respective optical axis.

4. The method as claimed in claim 1, further comprising:
   displacing the sample, wherein during the displacement an interface between an immersion medium in which the sample is embedded and a medium present upstream of an illumination objective is displaced.

5. The method as claimed in claim 4, wherein a position of a focus within an image field remains at an unchanged location during the method.

6. The method as claimed in claim 4, further comprising manipulating a detection beam path with respect to the focus position in a case that the optical medium with a refractive index that differs from the sample medium and/or the immersion medium is located between the detection optical unit and the sample.

7. The method as claimed in claim 1, wherein, based on the determined refractive index, owing to the manipulation of the beam path, a spherical imaging aberration is corrected by way of changing an optical path length of a beam path based on a distance from an optical axis.

8. The method as claimed in claim 7, wherein changing the optical path length comprises displacing at least one reflecting mirror section and/or displacing an interface of a deformable transmissive medium.

9. The method as claimed in claim 7, wherein changing the optical path length is substantially implemented in accordance with a superposition of the functional relationships $r^2$ and $r^4$ with, respectively, a first pre-exponential factor and a second pre-exponential factor, with r corresponding to the distance from the optical axis.

10. The method as claimed in claim 1, wherein the method manipulates the at least one beam path in a wavelength-dependent manner by the method being applied to light of the at least one beam path of a first wavelength, and setting at least one further wavelength.

11. The method as claimed in claim 10, wherein setting at least one further wavelength comprises respective, sequential manipulation of the at least one beam path of light of the at least one further wavelength by application of the method to the light of the at least one beam path of the at least one further wavelength.

12. The method as claimed in claim 1, wherein the method is repeated at specified temporal intervals.

13. The method as claimed in claim 1, further comprising reading of calibration data, wherein the at least one microscope parameter is set based on the determined refractive index and based on the calibration data.

14. A non-volatile computer-readable storage medium comprising a program for carrying out the method as claimed in claim 1.

15. A method for recording image stacks in a microscope, the method comprising:
   manipulating at least one beam path by: determining a refractive index of a sample arranged in a sample volume and/or of an optical medium arranged in the sample volume, and setting at least one microscope parameter based on the determined refractive index for manipulating the beam path; and
   capturing a change in a position of the sample with respect to an optical arrangement and/or capturing changes in an excitation wavelength before the at least one microscope parameter is set,
   wherein determining the refractive index of the sample and/or of the optical medium arranged in the sample volume comprises:
   (I) oblique irradiation of the sample volume with measurement light with respect to the optical axis using the optical arrangement;
   (II) reflecting the irradiating light at a reflective element provided in the sample volume at a first position;
   (III) imaging the reflected light onto a spatially resolving detector;

(IV) evaluating the signal detected by the detector with respect to a size and/or offset of the reflected light on the spatially resolving detector;

(V) displacing the reflective element along the optical axis to a second position and performing the method steps (III) and (IV); and (VI) determining the refractive index based on the size and/or the offset of the reflected light for the first position and the second position of the reflective element.

16. The method as claimed in claim 15, further comprising recording and/or storing an image for generating the image stack.

17. The method as claimed in claim 15, further comprising capturing a trigger signal for starting performance of further method steps.

18. An apparatus for manipulating at least one beam path in a microscope, the apparatus comprising:

a refractive-index determination module for determining the refractive index of a sample and/or the refractive index of an optical medium arranged in a sample volume; and at least one beam path manipulator for setting at least one microscope parameter based on the determined refractive index for manipulation of the at least one beam path, wherein determining the refractive index of the sample and/or of the optical medium arranged in the sample volume comprises:

(I) oblique irradiation of the sample volume with measurement light with respect to the optical axis using an optical arrangement;

(II) reflecting the irradiating light at a reflective element provided in the sample volume at a first position;

(III) imaging the reflected light onto a spatially resolving detector;

(IV) evaluating the signal detected by the detector with respect to a size and/or offset of the reflected light on the spatially resolving detector;

(V) displacing the reflective element along the optical axis to a second position and performing the method steps (III) and (IV); and (VI) determining the refractive index based on the size and/or the offset of the reflected light for the first position and the second position of the reflective element.

19. The apparatus as claimed in claim 18, wherein the beam path manipulator comprises at least one element from the following group:

an optical element having an electrically settable focal length;

an actuator module a correction ring;

a correction plate module for introducing correction plates into the beam path;

an optical arrangement equipped with a correction ring;

a deformable mirror; or a hollow element, filled with a transparent liquid medium, with at least one transparent entrance and/or exit face, wherein the at least one transparent entrance and/or exit face is deformable.

20. The apparatus as claimed in claim 18, further comprising a timer module which outputs at specified temporal intervals a starting signal for starting the measurement of the refractive index and/or for manipulation of the at least one beam path.

21. A method for recording image stacks in a microscope, the method comprising:

displacing a focal plane of a first optical arrangement by a preset scanning distance;

manipulating at least one beam path of the first optical arrangement for correcting imaging aberrations of the first optical arrangement by: determining a refractive index of a sample arranged in a sample volume and/or of an optical medium arranged in the sample volume, and setting at least one microscope parameter based on the determined refractive index for manipulating the beam path; and displacing or adjusting the focal plane of a second optical arrangement by an adjustment distance that is based on the determined refractive index, wherein determining the refractive index of the sample and/or of the optical medium arranged in the sample volume comprises:

(I) oblique irradiation of the sample volume with measurement light with respect to the optical axis using the first optical arrangement;

(II) reflecting the irradiating light at a reflective element provided in the sample volume at a first position;

(III) imaging the reflected light onto a spatially resolving detector;

(IV) evaluating the signal detected by the detector with respect to a size and/or offset of the reflected light on the spatially resolving detector;

(V) displacing the reflective element along the optical axis to a second position and performing the method steps (III) and (IV); and (VI) determining the refractive index based on the size and/or the offset of the reflected light for the first position and the second position of the reflective element.

22. The method as claimed in claim 21, wherein the displacing or adjusting the focal plane of the second optical arrangement comprises manipulating the at least one beam path of the second optical arrangement for correcting imaging aberrations of the second optical arrangement by: determining a refractive index of a sample arranged in a sample volume and/or of an optical medium arranged in the sample volume, and setting at least one microscope parameter based on the determined refractive index for manipulating the beam path.

23. The method as claimed in claim 21, wherein the method steps is repeated n times, wherein manipulating the at least one beam path of the first optical arrangement in the repetitions of the method includes only setting at least one microscope parameter based on the determined refractive index for manipulating the beam path.

24. A method for manipulating at least one beam path in a microscope, the method comprising:

determining a refractive index of a sample arranged in a sample volume and/or of an optical medium arranged in the sample volume; and setting at least one microscope parameter based on the determined refractive index for manipulating the beam path, wherein determining of the refractive index of the sample and/or of the optical medium arranged in the sample volume comprises the following method steps:

(i) focusing measurement light into the sample volume by an optical arrangement, wherein the measurement light is transmitted on a sample side of the optical arrangement by the optical medium and a further optical medium;

(ii) detecting the measurement light that is reflected by a reflective element and transmitted by a further optical arrangement or by the optical arrangement, using a detector arrangement or using a spatially resolving detector;
(iii) determining a working distance between the optical arrangement and the reflective element based on the measurement light detected by the detector, wherein, for the working distance, the focus of the measurement light lies on the reflective element;
(iv) varying at least one of the following parameters:
 (iv.1) distance between the optical arrangement and the sample medium;
 (iv.2) distance between the reflector and the further optical medium;
 (iv.3) divergence of the measurement light,
 wherein the varying results in a fixed distance change of a focus position of the measurement light;
(v) determining a further working distance according to method steps (i) to (iii);
(vi) determining a working distance change between the working distance and the further working distance; and
(vii) determining the refractive index based on the distance change and the working distance change.

* * * * *